US006593668B2

(12) United States Patent
Drobnik

(10) Patent No.: US 6,593,668 B2
(45) Date of Patent: Jul. 15, 2003

(54) METHOD AND APPARATUS FOR MULTIFREQUENCY POWER DISTRIBUTION

(75) Inventor: Josef C. Drobnik, Hilsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/475,483

(22) Filed: Dec. 30, 1999

(65) Prior Publication Data

US 2002/0181254 A1 Dec. 5, 2002

(51) Int. Cl.[7] .................................................. H02J 3/02
(52) U.S. Cl. ............................. 307/27; 307/21; 307/31
(58) Field of Search ............................. 307/27, 73, 38, 307/31, 21, 24; 713/300, 340

(56) References Cited

U.S. PATENT DOCUMENTS

| 4,447,695 A | * | 5/1984 | Inoue | ..................... 219/69.13 |
| 5,019,954 A | * | 5/1991 | Bourgeault et al. | ...... 363/21.12 |
| 5,103,110 A | * | 4/1992 | Housworth | ................... 307/73 |
| 5,572,073 A | * | 11/1996 | Burgess et al. | ................ 307/38 |
| 5,682,303 A | * | 10/1997 | Goad | ........................... 363/71 |
| 5,845,132 A | * | 12/1998 | Walsh et al. | ................. 710/260 |

FOREIGN PATENT DOCUMENTS

| DE | 19826735 A1 | 6/1997 |
| GB | 2332763 A | 12/1997 |

OTHER PUBLICATIONS

Patent Abstract of Japan, vol., No. 13, Nov. 30, 1998 Texas Instr, Inc, Publication No. 10228383. Aug. 98.
International Application Published under the Patent Cooperation Treaty (PCT) WO98/40980 (Videocom Inc), Sep. 17, 1998.

* cited by examiner

Primary Examiner—Shawn Riley
(74) Attorney, Agent, or Firm—Blakely, Sokoloff, Taylor & Zafman LLP

(57) ABSTRACT

A method and apparatus for distributing power in an electronic system including receiving a source power at a system power supply, converting the source power to a plurality of alternating current (AC) signals at multiple frequencies, and transmitting the plurality of AC signals at multiple frequencies to multiple voltage regulator modules (VRMs) in the electronic system.

29 Claims, 6 Drawing Sheets

METHOD AND APPARATUS FOR MULTIFREQUENCY POWER DISTRIBUTION

FIELD OF THE INVENTION

The present invention relates to the field of power distribution in computer systems. More specifically, the present invention relates to an alternating current (AC) power distribution system.

BACKGROUND OF THE INVENTION

One known approach used for distributing power from a power source to components on a computer system is the direct current (DC) power distribution system. The DC power distribution system typically includes a main power supply, voltage regulator modules, and connectors that couple the main power supply to the voltage regulator modules. The main power supply converts low frequency (approximately 50–60 Hz) AC power received from the power source into DC power. The main power supply then converts the DC power into high frequency AC power. The high frequency AC power is then stepped down, converted back to DC power, and filtered before being transmitted along a connector to a voltage regulator module corresponding to a component on the computer system. At the voltage regulator module (VRM), the DC power is converted to AC power, stepped down, converted to DC power and filtered before being delivered to a component on the computer system.

A drawback of the DC distribution system was that it imposed dual conversion on the power conversion chain. Dual power conversion added complexity as well as cost and parts-count to the distribution system. Furthermore, the dual power conversion reduced the efficiency of the distribution system. In addition, today's computer systems are being designed with more stringent power specifications. These specifications require increased slew rates (change of current over time). Current DC distribution systems have experienced difficulties in reliably supporting these requirements.

Additionally, the VRMs monitor the power output and regulates the power within the VRMs requiring controllers in the VRMs. Since each VRM has their own controller, the system does not have a centralized controller to regulate output power further adding complexity and circuitry. Another drawback of the known approach is that power to the processor is static and does not vary depending upon the power needs of the processor.

SUMMARY

A method for distributing power in an electronic system includes receiving power at a system power supply, converting the power into alternating current (AC) signal components at multiple frequencies, and transmitting the converted AC signal components at multiple frequencies to multiple voltage regulator modules (VRM) in the electronic system.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
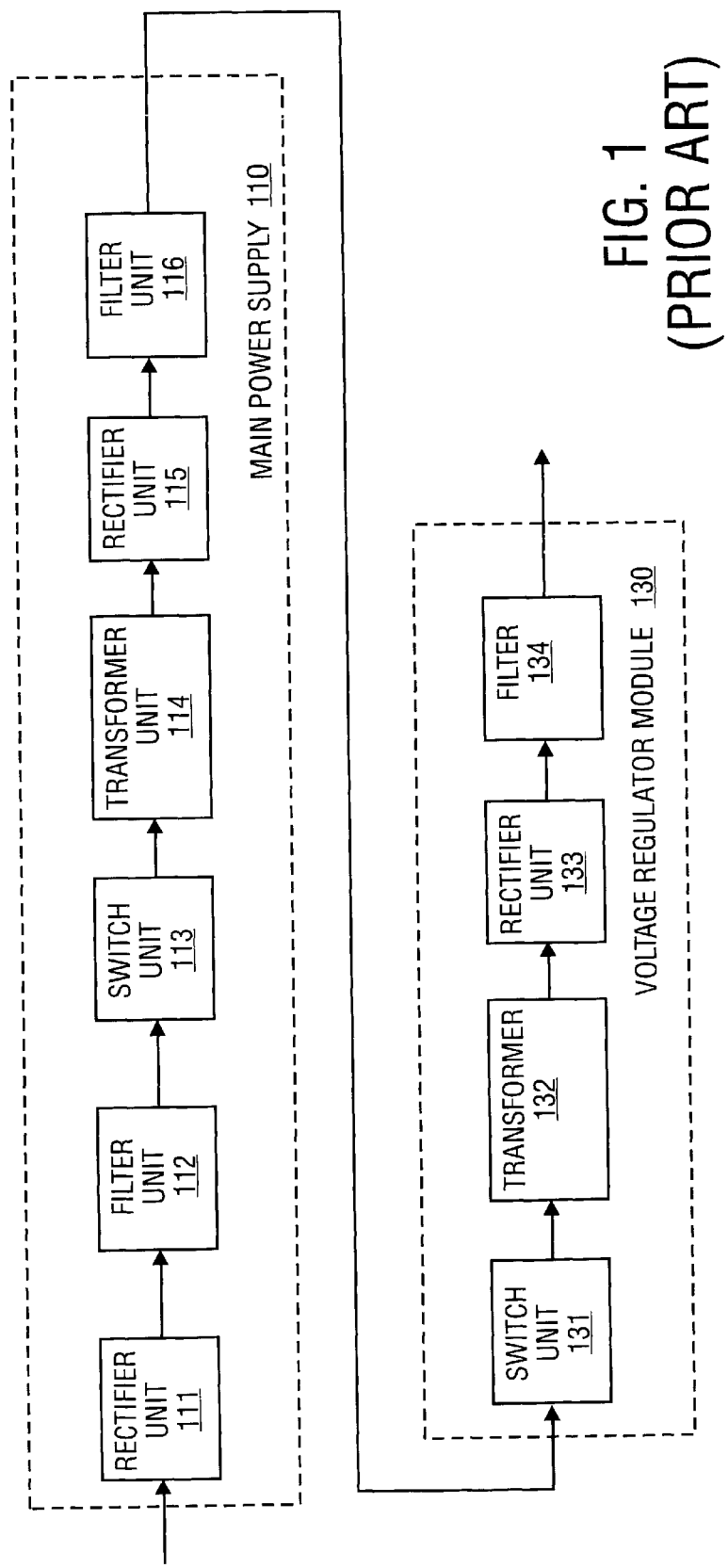
FIG. 1 is a block diagram of a conventional direct current power distribution system.

FIG. 1 illustrates a conventional direct current (DC) power distribution system 100 known in the prior art. The DC power distribution system 100 includes a main power supply 110 and a voltage regulator module 130. The main power supply 110 receives power from a power source (not shown) and processes the power before transmitting it to a voltage regulator module 130. The main power supply 110 includes a first rectifier unit 111 that receives [power in] a low frequency alternating current (AC) power from the power source. The first rectifier unit 111 converts the AC power to DC power. A first filter unit 112 is coupled to the first rectifier unit 111. The first filter unit 112 reduces ripple in the DC power and prevents transmission of noise generated by the main power supply 110. A first switch unit 113 is coupled to the first filter unit 112. The first switch unit 113 receives the DC power from the first filter unit 112 and converts the DC power to high frequency AC power. A first transformer 114 is coupled to the first switch unit 113. The first transformer 114 receives the high frequency AC power from the first switch unit 113 and steps the high frequency AC power down to a lower voltage level. A second rectifier unit 115 is coupled to the first transformer 114. The second rectifier unit 115 receives the high frequency AC power from the first transformer and converts the high frequency AC power to DC power. A second filter unit 116 is coupled to the second rectifier unit 115. The second filter unit 116 receives the DC power from the second rectifier unit 115 and filters away noise from the DC power and transmits the DC power to the voltage regulator module 130.

The voltage regulator module 130 receives the DC power from the main power supply 110 and further regulates the power before transmitting the power to a component on a computer system (not shown). The voltage regulator module 130 includes a second switch unit 131. The second switch unit 131 receives the DC power from the main power supply 110 and converts the DC power to AC power. A second transformer 132 is coupled to the second switch 131. The second transformer receives the AC power from the second switch and steps the AC power down to a lower level. A third rectifier unit 133 is coupled to the second transformer. The third rectifier receives the AC power and converts it to DC power. A second filter unit 134 is coupled to the third rectifier unit 133. The third filter unit 134 receives the DC power from the third rectifier unit 133 and filters away ripple from the DC power. The DC power is transmitted from the power regulator module 130 to a component requiring power.

Since most computer systems require multiple voltages, transformer 114 is required to have multiple windings. Additional rectifiers and filters in the main power supply 110 would connect the power from the additional windings of the transformer to additional connectors that transmits the power to point of use or to additional voltage regulator modules.

Figure 2:
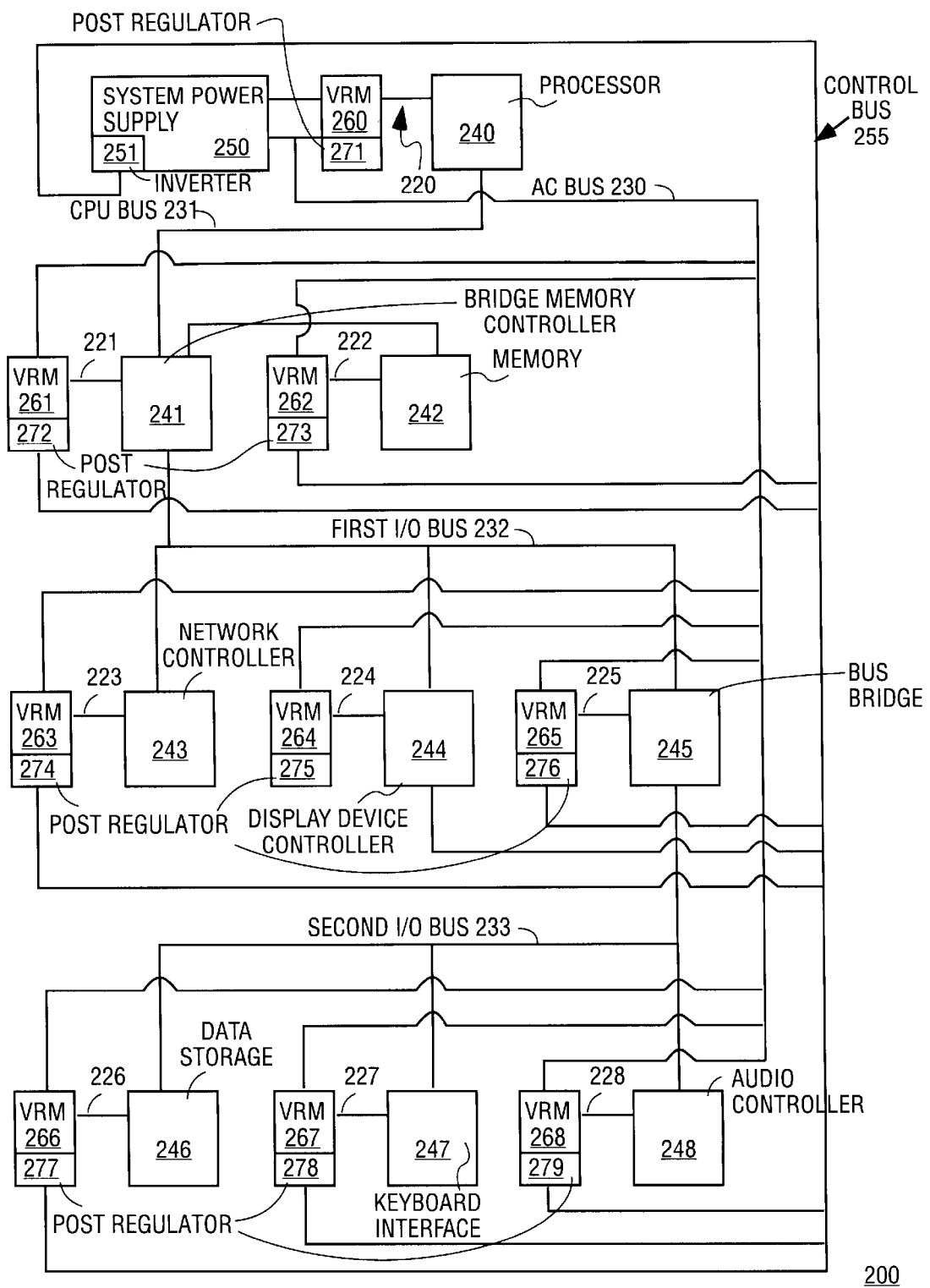
FIG. 2 is a block diagram of a computer system implementing an embodiment of the present invention.

FIG. 2 illustrates a computer system 200 upon which an embodiment of the present invention can be implemented. The computer system 200 includes a processor 240 that processes data signals. The processor 240 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 240 is coupled to a CPU bus 231 that transmits data signals between processor 240 and other components in the computer system 200.

The computer system 200 includes a memory 242. The memory 242 may be a dynamic random access memory (DRAM) device, a synchronous direct random access memory (SDRAM) device, or other memory device. The memory 242 may store instructions and code represented by data signals that may be executed by the processor 240.

A bridge/memory controller 241 is coupled to the CPU bus 231 and the memory 242. The bridge/memory controller 241 directs data signals between the processor 240, the memory 242, and other components in the computer system 200 and bridges the data signals between the CPU bus 231, the memory 242, and a first I/O bus 232.

The first I/O bus 232 may be a single bus or a combination of multiple buses. As an example, the first I/O bus 232 may comprise a Peripheral Component Interconnect (PCI) bus, a Personal Computer Memory Card International Association (PCMCIA) bus, a NuBus, or other buses. The first I/O bus 232 provides communication links between components in the computer system 200. A network controller 243 is coupled to the first I/O bus 232. The network controller 243 links the computer system 200 to a network of computers (not shown in FIG. 2) and supports communication among the machines. A display device controller 244 is coupled to the first I/O bus 232. The display device controller 244 allows coupling of a display device (not shown) to the computer system 200 and acts as an interface between the display device and the computer system 200. The display device controller 244 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 240 through the display device controller 244 and displays the information and data signals to the user of the computer system 200.

A second I/O bus 233 may be a single bus or a combination of multiple buses. As an example, the second I/O bus 233 may comprise a PCI bus, a PCMCIA bus, a NuBus, an Industry Standard Architecture (ISA) bus, or other buses. The second I/O bus 233 provides communication links between components in the computer system 200. A data storage device 246 is coupled to the second I/O bus 233. The data storage device 246 may be a hard disk drive, a floppy disk drive, a CD-ROM device, a flash memory device or other mass storage device. A keyboard interface 247 is coupled to the second I/O bus 233. The keyboard interface 247 may be a keyboard controller or other keyboard interface. The keyboard interface 247 may be a dedicated device or can reside in another device such as a bus controller or other controller. The keyboard interface 247 allows coupling of a keyboard (not shown) to the computer system 200 and transmits data signals from a keyboard to the computer system 200. An audio controller 248 is coupled to the second I/O bus 233. The audio controller 248 operates to coordinate the recording and playing of sounds.

A bus bridge 245 couples the first I/O bus 232 to the second I/O bus 233. The bus bridge 245 operates to buffer and bridge data signals between the first I/O bus 232 and the second I/O bus 233.

The computer system 200 includes a system power supply 250. The system power supply 250 receives power from a power source such as a wall socket (not shown), battery (not shown), or other power source. In an alternate embodiments the system power supply 250 will receive power from a battery (not shown) eliminating the need for a rectifier unit 311. The system power supply 250 includes an inverter unit 251 that processes the power received from the power source and transmits alternating current (AC) power at multiple frequencies on an AC bus 230. Additionally, the inverter receives a multiplexed digital feedback signal from a control bus 255. Furthermore, the inverter unit 251 receives data signals from the processor 240 on the CPU bus 231. The computer system 200 includes a multiple of high-frequency AC voltage regulator modules (HFAC VRM) 260–268. The HFAC VRMs 260–268 are coupled to the AC bus 230 and transmit multiplexed digital signals onto the control bus 255. The HFAC VRMs include post-regulator units 271–279 that regulates the power to a voltage and current level appropriate for processor 240, the memory 242, memory/bridge controller 241, network controller 243, display device controller 244, data storage device 246, keyboard interface 247, audio controller 248, and bus bridge 245 (shown in FIG. 2). It should be appreciated that the system power supply 250 may be implemented in electronic systems other than computer system 200.

Figure 3:
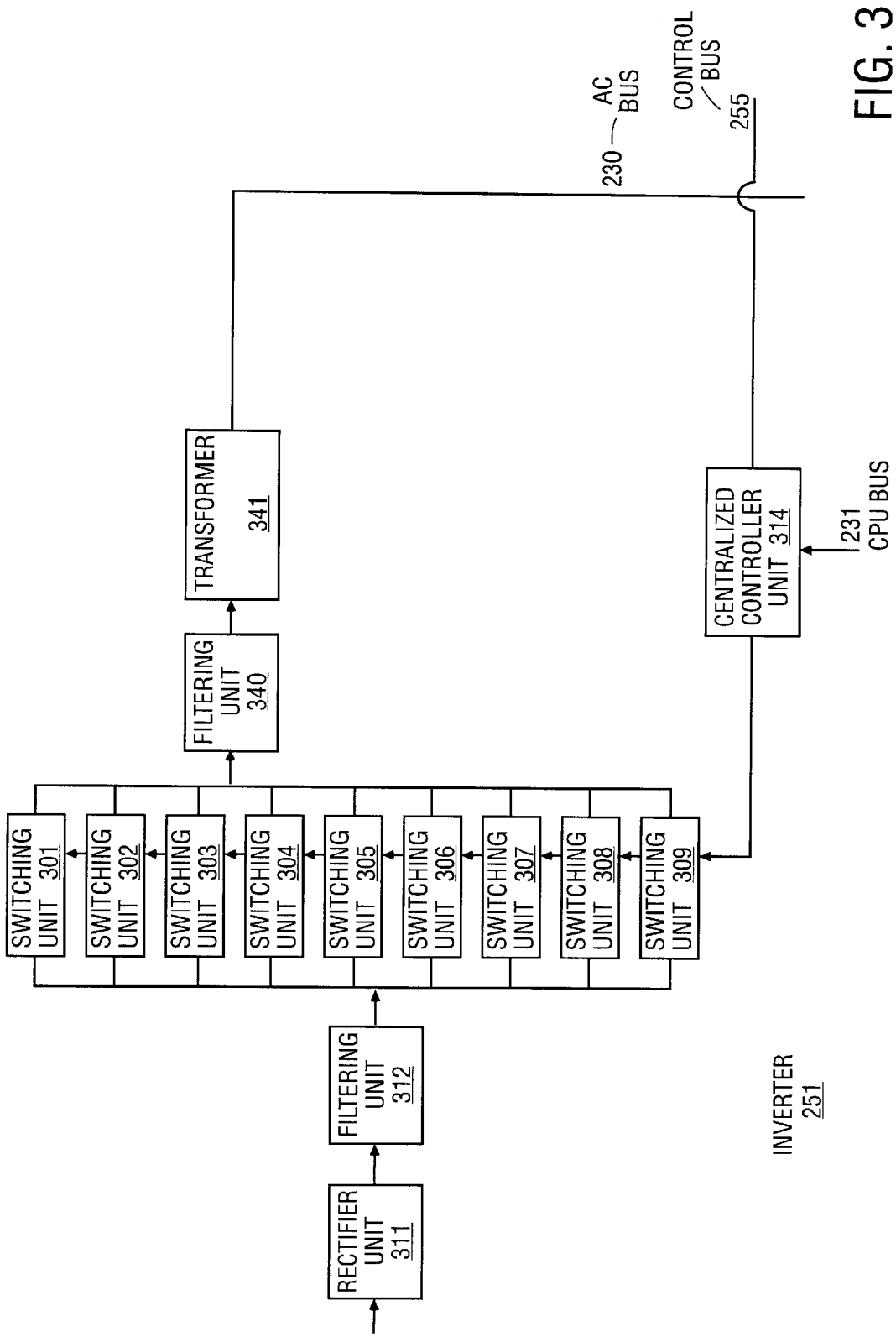
FIG. 3 is a block diagram illustrating an inverter system power supply according to an embodiment of the present invention.

FIG. 3 is a block diagram of one embodiment of an inverter unit 251 in system power supply 250 (shown in FIG. 2) according to the teaching of the present invention. The inverter unit 251 includes a rectifier unit 311. The rectifier unit 311 receives an AC power from a power source (not shown). The rectifier unit 311 converts the AC power to a DC power. The rectifier unit 311 is coupled to a first filtering unit 312. The first filtering unit 312 reduces ripple in the DC power and prevents transmission of noise generated by the system power supply 250. A multiple of switching units (single frequency sources) 301–309 are multiplexed and are coupled to the filter unit 312 and a centralized controller unit 314. Each of the switching units 301–309 receive the DC power from the filtering unit 312 and converts the DC power to high-frequency AC power with a specific frequency generating signal components at multiple frequencies. Each signal component has a particular frequency and corresponds to one or more HFAC VRMs. Additionally, each of the switching units 301–309 receives a control signal from the centralized controller unit 314 and directly adjusts the amplitude of the appropriate frequency signal component which corresponds to each of the appropriate HFAC VRMs 260–268.

A second filtering unit 340 is coupled to the switching units 301–309. The filtering unit 340 receives the high-frequency AC power containing multiple frequencies from the switching units 301–309 and filters away ripple from the high-frequency AC power containing multiple frequencies before transmitting it onto the AC bus 230.

In the illustrated embodiment, a centralized controller unit 314 is coupled to the multiple of switching units 301–309, the control bus 255, and the CPU bus 231. The controller unit 314 receives multiplexed digital signals from the control bus 255 representing feedback from the multiple HFAC VRMs as discussed below. Centralized controller unit 314 compares these feedback with references and generates control signals which directly adjust each of the switching units 301–309 in order to adjust the amplitudes of the appropriate frequencies which correspond to each of the appropriate HFAC VRMs 260–268. Additionally, in one embodiment, the centralized controller unit 314 receives data signals from the CPU 240 via processor bus 231, and the CPU can adjust the power to the CPU according to the needs of the CPU. As discussed below, each of the switching units 301–309 can also be adjusted in response to the data signal received from the CPU 240.

A transformer unit 341 is coupled to the filtering unit 340 and the AC bus 230. The transformer unit 341 receives the high-frequency AC power containing multiple frequencies from the AC filtering unit 340 and steps the high-frequency AC power down to a lower level and transmits the AC power onto the AC bus 230.

The rectifier unit 311, multiple switching units 301–309, filtering unit 340, centralized controller unit 314, and the transformer unit 341 may be implemented using any known circuitry or technique. According to an embodiment of the present invention, the rectifier unit 311, switching units 301–309, and the centralized controller unit 314 may all reside on a single semiconductor, may be discrete components, or may be a combination of both.

Figure 4:
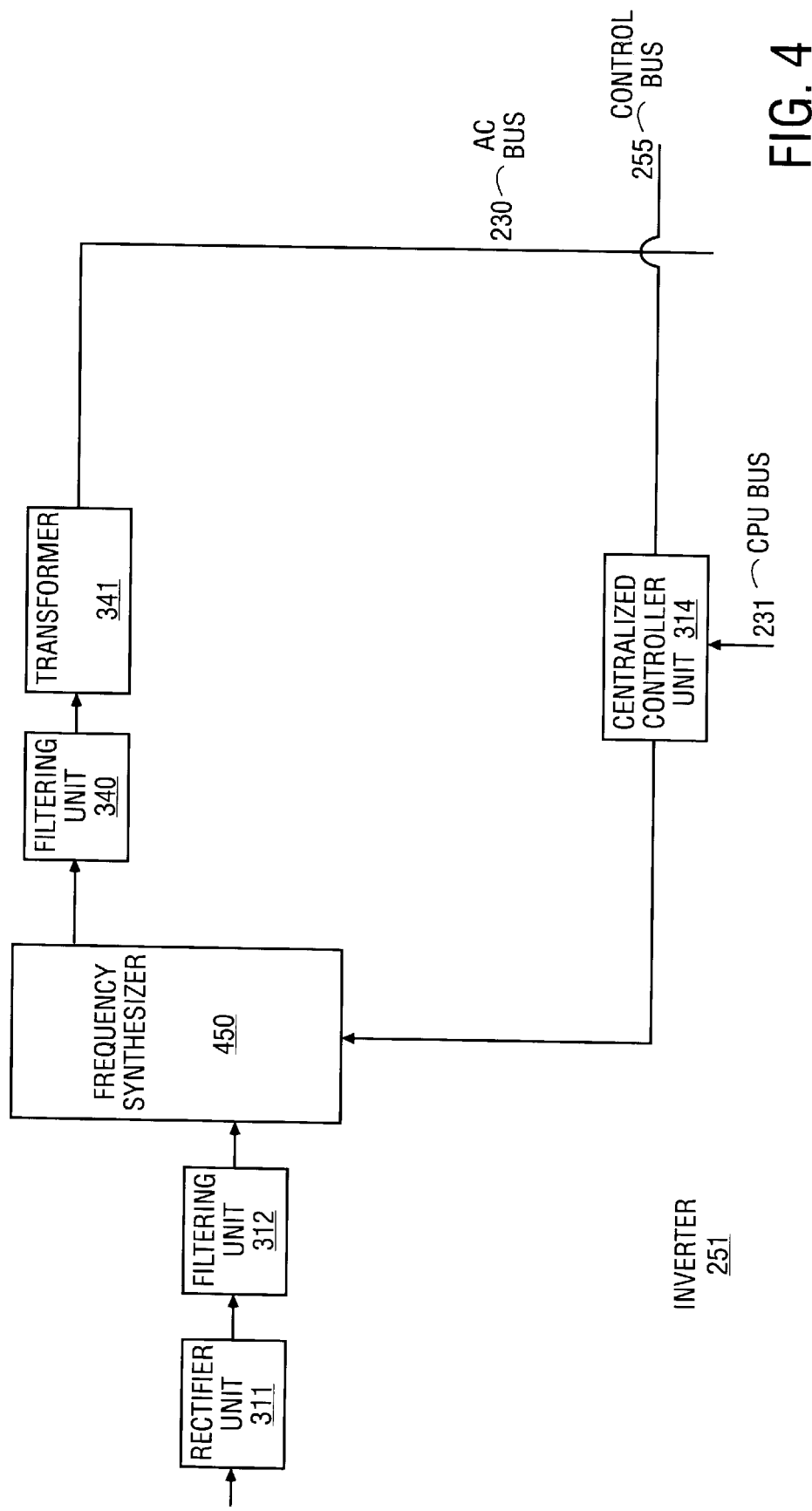
FIG. 4 is a block diagram illustrating an inverter system power supply according to an alternate embodiment of the present invention.

FIG. 4 shows an alternate embodiment of inverter 251 (shown in FIG. 2). In the illustrated embodiment, a frequency synthesizer 450 is used in place of multiple switching units 301–309 (shown in FIG. 3) to generate the high-frequency AC power having multiple frequencies. In various embodiments, any number of techniques can be used to generate the high-frequency AC power at multiple frequencies.

Figure 5:
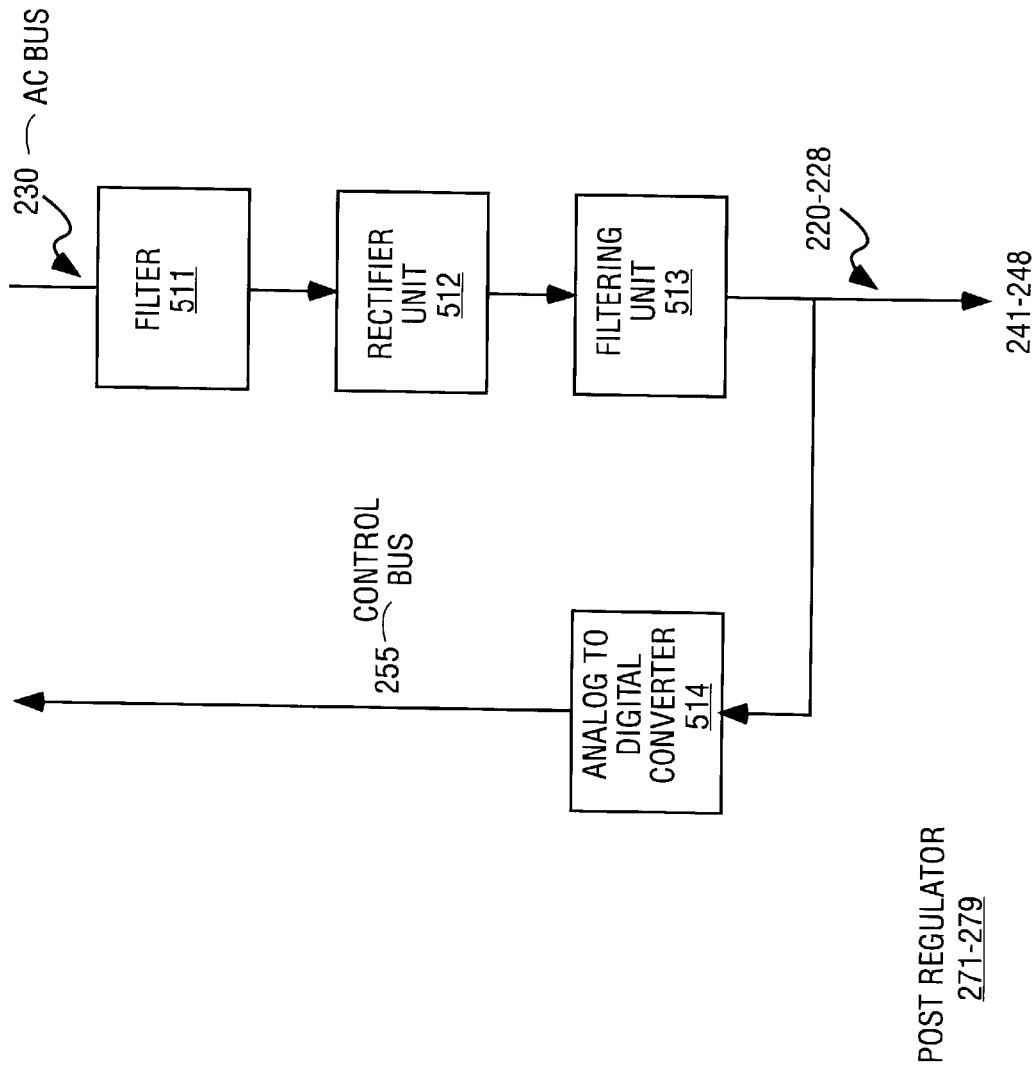
FIG. 5 is a block diagram illustrating a post-regulator in an alternating current voltage regulator modulate according to an embodiment of the present invention.

FIG. 5 is a block diagram of one embodiment of one of a multiple post-regulator units 271–279 in a multiple of HFAC VRMs 260–268 (shown in FIG. 2) according to the teachings of the present invention. Each of the post-regulator units 271–279 is coupled to the AC bus 230 and the control bus 255. Each of the post-regulator units 271–279 include a filter 511 and a rectifier unit 512. The filter 511 receives the multiple of frequencies and filters out harmonics separating the multiple frequencies to a single specific frequency corresponding to the specific HFAC VRMs for specific components in the computer system. Rectifier unit 512 receives the high-frequency AC power containing the single specific frequency from the filter 511 and converts the signal component of the high-frequency AC power signal into an output DC power signal. In an alternate embodiment, a step down transformer (not shown) may be included as part on the rectifier unit 512 to step down the high-frequency AC power to a lower power level.

A filtering unit 513 is coupled to the rectifier unit 512. The filtering unit 513 receives the DC power from the rectifier unit 512 and filters away ripple from the DC power before transmitting the power to a component on the computer system (not shown) via lines 220–228 (shown in FIG. 2).

An analog to digital converter unit 514 is coupled to the lines 220–228 and the control bus 255. The analog to digital converter unit 514 senses and digitizes the output voltage of the filtering unit 513, multiplexes this digital signal and feeds it into the control bus 255. According to an embodiment of the present invention, each of the post regulator units 271–279 may include only the rectifier unit 512 that converts the high-frequency AC power from the AC bus into the DC power before transmitting it to the lines 220–228.

The rectifier unit 512, filtering unit 513, and the analog to digital converter unit 514 may be implemented using any known circuitry or technique. According to an embodiment of the present invention, the rectifier unit 512, filtering unit 513, and the analog to digital converter unit 514 may all reside on a single semiconductor substrate, be discrete components, or be a combination of both.

The system power supply 250 (shown in FIG. 2) and the multi-frequency AC voltage regulator modules 260–268 (shown in FIG. 2) allows for the distribution of high-frequency AC power containing multiple frequencies. Distribution of the high-frequency AC power containing multiple frequencies improves the reliability of voltage regulation to components in the computer system having high current differential over time (DI/DT) requirements.

The system power supply 250 and the high-frequency AC voltage regulator modules 260–268 also eliminate the need for dual conversion as required by DC power distribution systems. Furthermore, the utilization of the AC bus 230 to distribute high-frequency AC power containing multiple frequencies eliminates the requirement of multiple conversion stages, multiple winding transformers, and additional rectifiers and filters.

Furthermore, in the illustrated embodiment, the utilization of multiple frequencies controlled by a centralized controller 314 via control bus 255, an analog digital converter 514, and a processor 240 creating a centralized digital feedback loop (CDFL) eliminates multiple control loops, simplifies the HFAC VRMs, and brings intelligence into the power architecture. Additionally, power to the processor can be dynamically controlled depending upon the needs of the processor.

Figure 6:
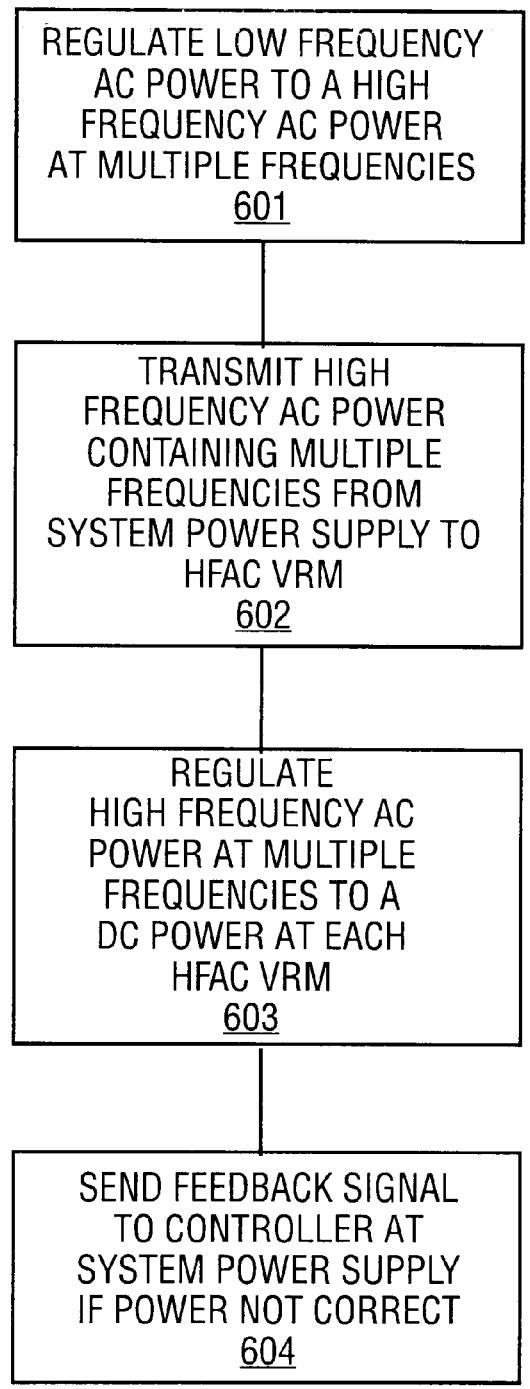
FIG. 6 is a flow chart illustrating a method for distributing power according to an embodiment of the present invention.

FIG. 6 is a flow chart illustrating a method for distributing power according to an embodiment of the present invention. At step 601, low frequency AC power is regulated to high-frequency AC power containing multiple frequencies. According to an embodiment of the present invention, the low frequency AC power is regulated to the high-frequency AC power by rectifying the power from the AC low frequency power to DC power and converting the DC power to the high-frequency AC power at multiple switching units in parallel. An alternative embodiment would include converting the DC power to the high-frequency AC power utilizing a frequency synthesizer.

At step 602, the high-frequency AC power containing multiple frequencies is transmitted from a system power supply to multiple high-frequency AC voltage regulator modules.

At step 603, the high-frequency AC power containing multiple frequencies is regulated to a DC power. According to an embodiment of the present invention, the power is regulated from the high-frequency AC power to the DC power by stepping down the power and rectifying the high-frequency AC power to the DC power.

At step 604, a feedback signal is sent to the centralized controller in the power supply to adjust the power transmitted to the particular HFAC VRM accordingly if necessary. According to the present embodiment, the feedback signal is sent by converting an analog signal to a digital signal and sending the digital feedback signal to the centralized power supply via a control bus.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method, comprising:
   receiving a source power at a system power supply;
   converting the source power to a plurality of alternating current (AC) signals at a plurality of frequencies, each of the plurality of AC signals having a particular frequency that corresponds to any one of a plurality of AC voltage regulator modules (VRM) in an electronic system; and
   transmitting the plurality of AC signals to the plurality of VRMs.

2. The method of claim 1 further comprising:
   receiving a feedback signal from the plurality of VRMs; and
   adjusting the plurality of AC signals being transmitted to the plurality of VRMs based at least in part on the feedback signal.

3. The method of claim 1 further comprising:
   receiving a control signal from a central processing unit (CPU); and
   adjusting the plurality of AC signals being transmitted to the plurality of VRMs based at least in part on the control signal.

4. The method of claim 3 wherein adjusting the plurality of AC signals further comprises adjusting voltage levels at various frequencies.

5. The method of claim 1 wherein the source power is a low frequency AC power or a direct current (DC) power.

6. The method of claim 1 wherein each of the plurality of AC signals corresponds to at least one of the plurality of VRMs.

7. The method of claim 1 wherein the plurality of frequencies are high frequency AC frequencies.

8. The method of claim 1 wherein the plurality of VRMs comprise a central processing unit (CPU) to control its input voltage dynamically.

9. The method of claim 1 wherein the source power comprises a low frequency AC signal and wherein the converting comprises:
   rectifying the low frequency AC signal to a direct current (DC) signal; and
   transforming the DC signal to the plurality of AC signals at the plurality of frequencies.

10. The method of claim 1 further comprising:
    smoothing the plurality of AC signals at the plurality of frequencies prior to transmitting.

11. The method of claim 1 further comprising:
    receiving the plurality of AC signals at a first VRM of the plurality of VRMs;
    filtering the plurality of AC signals to a specific signal at a particular frequency that corresponds to the VRM; and
    converting the specific signal at the particular frequency into an output DC signal.

12. The method of claim 11 further comprising:
    generating a feedback signal based on the output DC signal;
    sending the feedback signal to the system power supply; and
    adjusting the specific signal at the particular frequency at the system power supply based on the feedback signal.

13. A method comprising:
    receiving a plurality of AC signals at a plurality of frequencies at a voltage regulator module (VRM);
    filtering the plurality of AC signals to a specific signal at a particular frequency that corresponds to the VRM; and
    converting the specific signal at the particular frequency into a DC output signal.

14. The method of claim 13 further comprising:
    generating a feedback signal based on the DC output signal; and
    sending the feedback signal to a controller, said controller to adjust the specific signal based on the feedback signal.

15. The method of claim 13 further comprising:
    filtering the DC output signal to filter away ripple.

16. A system power supply, comprising:
    a first input port to receive a source power in a first domain; and
    an inverter to convert the source power into a plurality of AC signals at a plurality of frequencies, each of the plurality of AC signals having a particular frequency that corresponds to a particular AC voltage regulator module (VRM) of an electronic system, and to transmit the plurality of AC signals from the system power supply to the plurality of VRMs.

17. The system power supply of claim 16 further comprising:
    a second input port to receive a feedback signal from the plurality of VRMs via a control bus wherein the inverter comprises a centralized controller to adjust the plurality of AC signals being transmitted to the plurality of VRMs based on the feedback signal.

18. The system power supply of claim 16 further comprising:
    a second input port to receive a control signal from a central processing unit (CPU); and
    an adjustment unit to adjust the plurality of AC signals being transmitted to the plurality of VRMs based on the control signal.

19. The system power supply of claim 16 wherein the source power is a low frequency AC power or a direct current (DC) power.

20. The system power supply of claim 16 wherein the source power comprises a low frequency AC signal, wherein the inverter comprises a rectifier unit to rectify the low frequency AC signal to a direct current (DC) signal; and a plurality of switching units connected in parallel.

21. The system power supply of claim 16 wherein the source power includes a low frequency AC signal, and wherein the inverter includes a rectifier unit to rectify the low frequency AC signal to a direct current (DC) signal, and wherein the inverter includes a frequency synthesizer to transform the DC signal to the plurality of AC signals at the plurality of frequencies.

22. The system power supply of claim 16 further comprising a filter for smoothing the plurality of AC signals at the plurality of frequencies prior to transmitting.

23. A voltage regulator module (VRM) comprising:

an input port to receive a plurality of AC signals at a plurality of frequencies;

a filter to filter the plurality of AC signals to a specific signal at a particular frequency that corresponds to the VRM; and a rectifier unit to convert the specific signal at the particular frequency into a DC output signal.

24. The VRM of claim 23 further comprising:

a feedback signal generator to generate a feedback signal based on the DC output power signal; and a sending unit to send the feedback signal to a system power supply, said system power supply to adjust the specific signal based on the feedback signal.

25. A system comprising:

an alternating current (AC) bus;

a plurality of voltage regulator modules (VRM); and a system power supply to receive a source power to convert the source power to a plurality of AC signals having a plurality of frequencies, each of the plurality of AC signals having a particular frequency that corresponds to a particular VRM, and to transmit the plurality of AC signals to the plurality of VRMs.

26. The system of claim 25 further comprising a control bus to couple the system power supply and the plurality of VRMs, each VRM to filter the plurality of AC signals to a specific signal with a particular frequency that corresponds to the VRM, to convert the specific signal at the particular frequency into a DC output signal, to generate a feedback signal based on the DC output signal, and to transmit the feedback signal to the control bus.

27. The system of claim 26, further comprising:

a centralized controller unit to receive the feedback signal and to generate a control signal to adjust the amplitude of the specific signal corresponding to the particular VRM.

28. The system of claim 25, wherein the power supply comprises:

a plurality of switching units to produce the plurality of AC signals at the plurality of frequencies.

29. The system of claim 25, wherein the power supply comprises:

a frequency synthesizer to produce the plurality of AC signals having the plurality of frequencies.

* * * * *

UNITED STATES PATENT AND TRADEMARK OFFICE
CERTIFICATE OF CORRECTION

PATENT NO. : 6,593,668 B2
DATED : July 15, 2003
INVENTOR(S) : Drobnik

It is certified that error appears in the above-identified patent and that said Letters Patent is hereby corrected as shown below:

Column 3,
Line 49, delete "The.bridge" and insert -- The bridge --.

Column 4,
Line 38, delete "embodiments" and insert -- embodiment --.

Signed and Sealed this

Second Day of December, 2003

JAMES E. ROGAN
*Director of the United States Patent and Trademark Office*